(12) United States Patent
Hattar et al.

(10) Patent No.: US 10,072,599 B2
(45) Date of Patent: Sep. 11, 2018

(54) CONTROL OF AN INTERNAL COMBUSTION ENGINE

(75) Inventors: Christer Hattar, Vasa (FI); Fredrik Östman, Vaasa (FI); Patrik Fors, Vasa (FI); Ulf Åstrand, Vasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 1164 days.

(21) Appl. No.: 13/703,599

(22) PCT Filed: May 23, 2011

(86) PCT No.: PCT/FI2011/050464
§ 371 (c)(1),
(2), (4) Date: Feb. 14, 2013

(87) PCT Pub. No.: WO2011/154592
PCT Pub. Date: Dec. 15, 2011

(65) Prior Publication Data
US 2013/0144511 A1    Jun. 6, 2013

(30) Foreign Application Priority Data
Jun. 11, 2010   (FI) ..................................... 20105667

(51) Int. Cl.
*G06F 19/00*   (2018.01)
*F02M 21/02*   (2006.01)
(Continued)

(52) U.S. Cl.
CPC ....... *F02D 41/3005* (2013.01); *F02D 35/027* (2013.01); *F02D 41/008* (2013.01);
(Continued)

(58) Field of Classification Search
CPC .... F02D 41/246; F02D 41/0025; F02D 41/40; F02D 41/402; F02D 41/1497;
(Continued)

(56) References Cited

U.S. PATENT DOCUMENTS 5,315,973 A * 5/1994 Hill ..................... F02B 23/0672
                                                 123/27 GE
5,713,336 A * 2/1998 King ....................... F02B 69/00
                                                 123/525

(Continued)

FOREIGN PATENT DOCUMENTS

JP         57 168036 A     10/1982
JP        200717045 A       7/2007
(Continued)

*Primary Examiner* — Syed O Hasan
(74) *Attorney, Agent, or Firm* — Muncy, Geissler, Olds & Lowe, P.C.

(57) ABSTRACT

An internal combustion engine uses gaseous main fuel and liquid pilot fuel and has a plurality of cylinders and an engine controller capable of adjusting a burning state of each cylinder through fuel regulation, including fuel cut off, upon occurrence of abnormal combustion. A method of operating the internal combustion engine includes, upon occurrence of abnormal combustion in a cylinder in a gaseous mode, cutting off the main fuel into only the cylinder and the fuel injection is kept partially active with a pilot fuel injected by a pilot nozzle of the cylinder.

5 Claims, 5 Drawing Sheets

(51) Int. Cl.
*F02D 41/30* (2006.01)
*F02D 35/02* (2006.01)
*F02D 41/00* (2006.01)
*F02D 41/14* (2006.01)
*F02D 41/22* (2006.01)

(52) U.S. Cl.
CPC ..... *F02D 41/0025* (2013.01); *F02D 41/1446* (2013.01); *F02D 41/22* (2013.01); *F02D 2200/1015* (2013.01); *Y02T 10/40* (2013.01)

(58) Field of Classification Search
CPC ............ F02D 19/0623; F02D 19/0631; F02D 19/105; F02D 41/3005; F02D 35/027; F02D 41/008; F02D 41/1446; F02D 41/22
USPC ....................... 701/104, 112; 123/27 GE, 525
See application file for complete search history.

(56) References Cited

U.S. PATENT DOCUMENTS

| | | | |
|---|---|---|---|
| 5,713,339 A * | 2/1998 | Kishida | F02D 41/1497 123/676 |
| 6,250,260 B1 * | 6/2001 | Green | 123/27 GE |
| 6,820,597 B1 * | 11/2004 | Cullen et al. | 123/520 |
| 7,844,390 B2 * | 11/2010 | Suzuki et al. | 701/112 |
| 8,469,009 B2 * | 6/2013 | Munshi et al. | 123/525 |
| 2006/0283423 A1 * | 12/2006 | Ito | F02D 19/081 123/406.45 |
| 2007/0125321 A1 * | 6/2007 | Ritter | F02B 29/0418 123/27 GE |
| 2013/0144511 A1 * | 6/2013 | Hattar et al. | 701/104 |

FOREIGN PATENT DOCUMENTS

| | | | | |
|---|---|---|---|---|
| JP | 2009074436 A | | 4/2009 | |
| WO | WO 99/46496 | * | 9/1999 | ............ F02D 19/10 |
| WO | WO 99/46496 A1 | | 9/1999 | |

* cited by examiner

CONTROL OF AN INTERNAL COMBUSTION ENGINE

FIELD OF TECHNOLOGY

The present invention relates to a control of an internal combustion engine upon occurrence of abnormal combustion. Engine being capable of stepwise or continuously correcting combustion state through fuel regulation including fuel cut off, in order to execute stopping or output limit operation of the engine, and also relates to an apparatus for controlling internal combustion engine upon occurrence of abnormal combustion.

BACKGROUND ART

For internal combustion engines, it is essential to avoid extreme operating points of the engine such as heavy knock and misfire. Heavy knock causes rapid pressure oscillations of excessive magnitudes which potentially lead to a total breakdown of mechanical components. Cylinder misfire again increases emissions significantly and is potentially harmful for catalysts. In addition, for gas engines it is essential to cut-off the fuel supply to a misfiring cylinder, as the gas otherwise flows to the exhaust-gas pipe and explodes.

A multiple cylinder gas engine or a multiple cylinder diesel engine for power generation incorporates a control for stopping the engine when abnormal combustion, for example heavy knock, occurs in one or more cylinders.

In a conventional internal combustion engine, when continuous heavy knock occurs in one of the cylinders in a normal operating condition, the supply of fuel into all of the cylinders is cut off so as to stop the engine after a predetermined time elapses from the time of detection of the heavy knock. The engine merely comes to a stop after the detection of occurrence of heavy knock in order to protect the engine.

A patent document JP11093757A discloses solution to prevent the pre-ignition by detecting a knocking as the occurrence of a pre-ignition when the knocking is continued over a prescribed period regardless of the suppression of knocking by the control of fuel parameter when the knocking is detected, and reducing the output of the corresponding cylinder. In JP11093757, no consideration is made for detailed control for operation of fuel cut off of an engine upon occurrence of abnormal combustion.

WO 2008038827A1 discloses an operation method of an engine during abnormal combustion in which operation control of the engine can be performed appropriately after fuel supply interruption to a heavy knock-inflicted cylinder without stopping the engine immediately upon detection of occurrence of heavy knock. In WO 2008038827A1, no consideration is made for detailed control for operation of fuel cut off of an engine upon occurrence of abnormal combustion.

SHORT DESCRIPTION OF INVENTION

The objective of the invention is to reduce the problems of prior art. The objective will be achieved as presented in the independent claims.

Disclosed is a method and control device for purpose of potentially hazardous situations, such as continuous heavy-knock or misfiring in internal combustion engine. Cut off of main fuel into one of the cylinders is executed based on measurements, such as cylinder pressures, cylinder knock and exhaust gas temperatures.

One embodiment discloses a control method of operating an internal combustion engine with plurality of cylinders and an engine controller adjusting burning state of each cylinder through fuel regulation, including cut off of fuel, upon occurrence of abnormal combustion in the cylinder. The method comprises measuring exhaust gas temperature of the cylinder in restricted injection state, where cutoff of main fuel is made. Main fuel injection is restored to the cylinder in restricted injection state if measured exhaust gas temperature is within temperature range predetermined for cylinder in restricted injection state. Burning state of said cylinder is determined and main fuel injection cutting off if burning state of said cylinder does not fulfil burning state value determined for restricted injection state.

According to one aspect of the invention, the burning state value is determined for restricted injection state by measuring exhaust gas temperature.

According to one aspect of the invention, the restoring of main fuel injection is executed if measured exhaust gas temperature is within temperature range for a period of time predetermined for restricted injection state.

According to one aspect of the invention, the period of time predetermined for restricted injection state is dependent on number attempt of the restoration main fuel injection.

According to one aspect of the invention, the number attempts of the restoration main fuel injection is limited.

Second embodiment discloses a control method of operating an internal combustion engine with plurality of cylinders and an engine controller adjusting burning state of each cylinder through fuel regulation, including cut off of fuel, upon occurrence of abnormal combustion in cylinder. This embodiment is applicable to operate an internal combustion engine using liquid pilot fuel, which engine has a plurality of cylinders and engine controller capable of adjusting a burning state of each cylinder through fuel regulation, including fuel cut off, upon occurrence of abnormal combustion. Upon occurrence of abnormal combustion in a cylinder the fuel injection is kept partially active with a pilot fuel injected by pilot injector of said cylinder. The second embodiment is applicable independently or with first embodiment of the invention.

According to one aspect of the second embodiment, the burning state of the cylinder for which the cutoff of main fuel is detected and compared to burning state predetermined for amount of fuel injected by the pilot injection.

According to one aspect of the second embodiment, the amount of pilot fuel injected to the cylinder for which the cutoff of main fuel is made, is increased.

LIST OF FIGURES

In the following, the invention is described in more detail by reference to the enclosed drawings, where:

FIG. 1 illustrates an example of an internal combustion engine and an engine controller adjusting burning state of each cylinder through fuel regulation;

FIG. 2 illustrates, where burning state of one the cylinders is regulated;

FIG. 3 is a flowchart of an embodiment illustrating steps to determinate the need for fuel regulation;

FIG. 4 is a flowchart illustrating steps to recover from fuel regulation;

FIG. 5 is a flowchart of a second embodiment illustrating steps to determinate the need for fuel regulation; and FIG. 6 is a flowchart illustrating steps to recover from fuel regulation.

DESCRIPTION OF THE FIGURES

Internal combustion engine 2 of FIG. 1 has a plurality of cylinders 3, here four. A control device 10 regulates amount of fuel delivered to engine 2 with control signals 21 and 22. Control signal 21 controls ignition device or pilot fuel injector. Main fuel control signal 22 controls main fuel actuator 32.

Stopping of the fuel injection is activated based on measurements. The control device 10 receives measurement data relating to cylinders 3. Reference number 41 denotes exhaust gas temperature measurement and reference number 41 denote measurement of cylinder pressures (pressure sensor) and/or cylinder knock (accelerometer).

According to second embodiment (FIGS. 5 and 6), the fuel injection is kept partially active with a fuel injected by pilot nozzle. Pilot-fuel injection is kept active, despite CCO, to maintain partial combustion in controlled cylinder. This has an advantage, especially in gaseous mode, to prevent excessive amounts of fuel flowing to the exhaust-gas pipe system during solenoid-valve malfunction.

Figure 1:
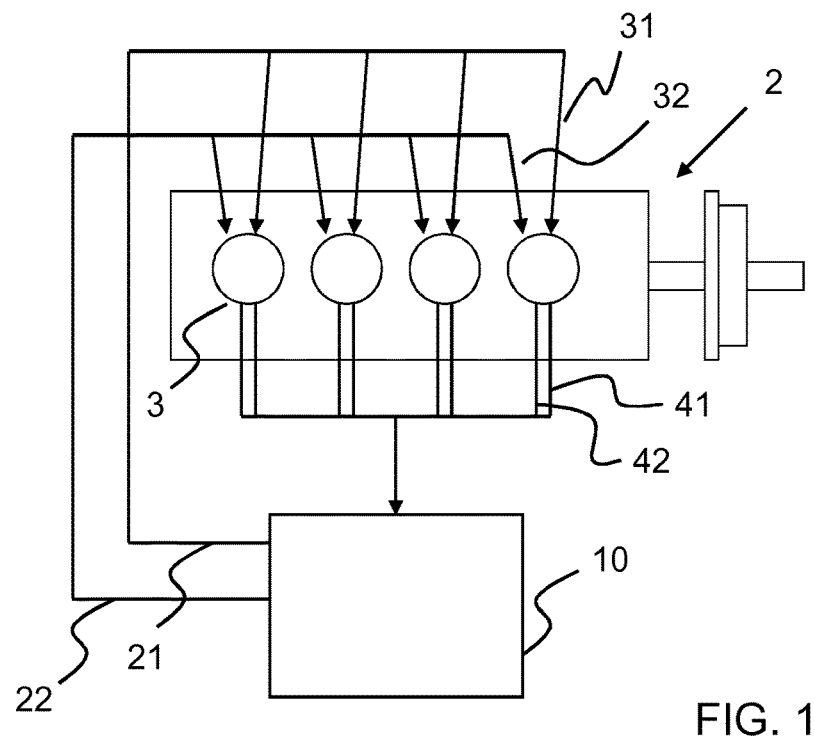
Figure 2:
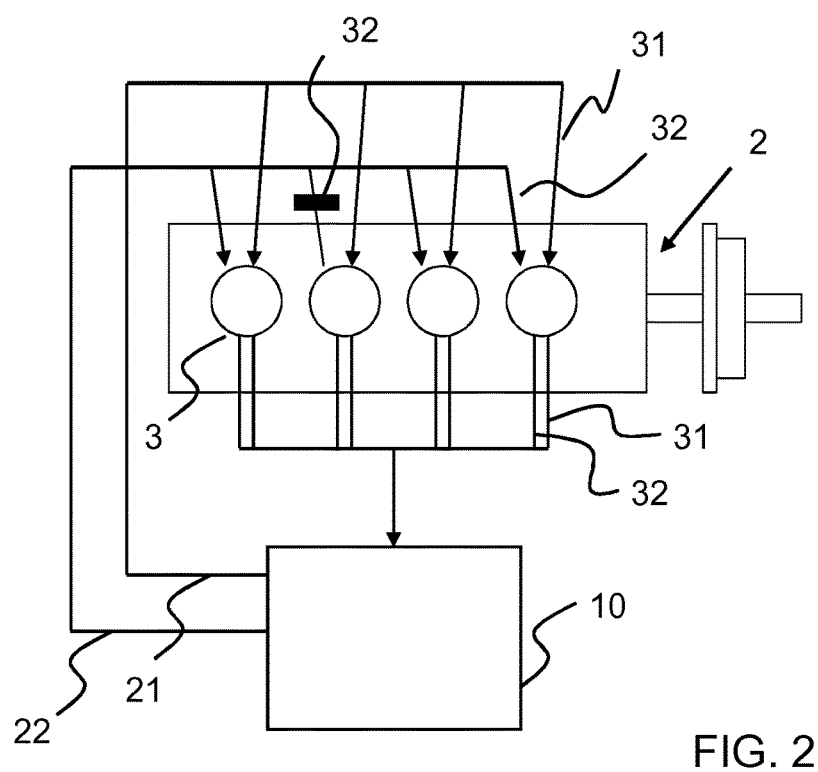
FIG. 2 illustrates a so-called cold cylinder operation (CCO), where one of the cylinders has been identified with poor cylinder performance (either heavy knock or total misfiring) and needs to be adjusted. Determination of poor cylinder performance is based on measurements 41, 42 of cylinder-wise cylinder pressures, cylinder knock (accelerometer) and/or exhaust-gas temperatures. Fuel injection to one of the cylinders 3 is restricted with respective main fuel actuator 32.
Figure 3:
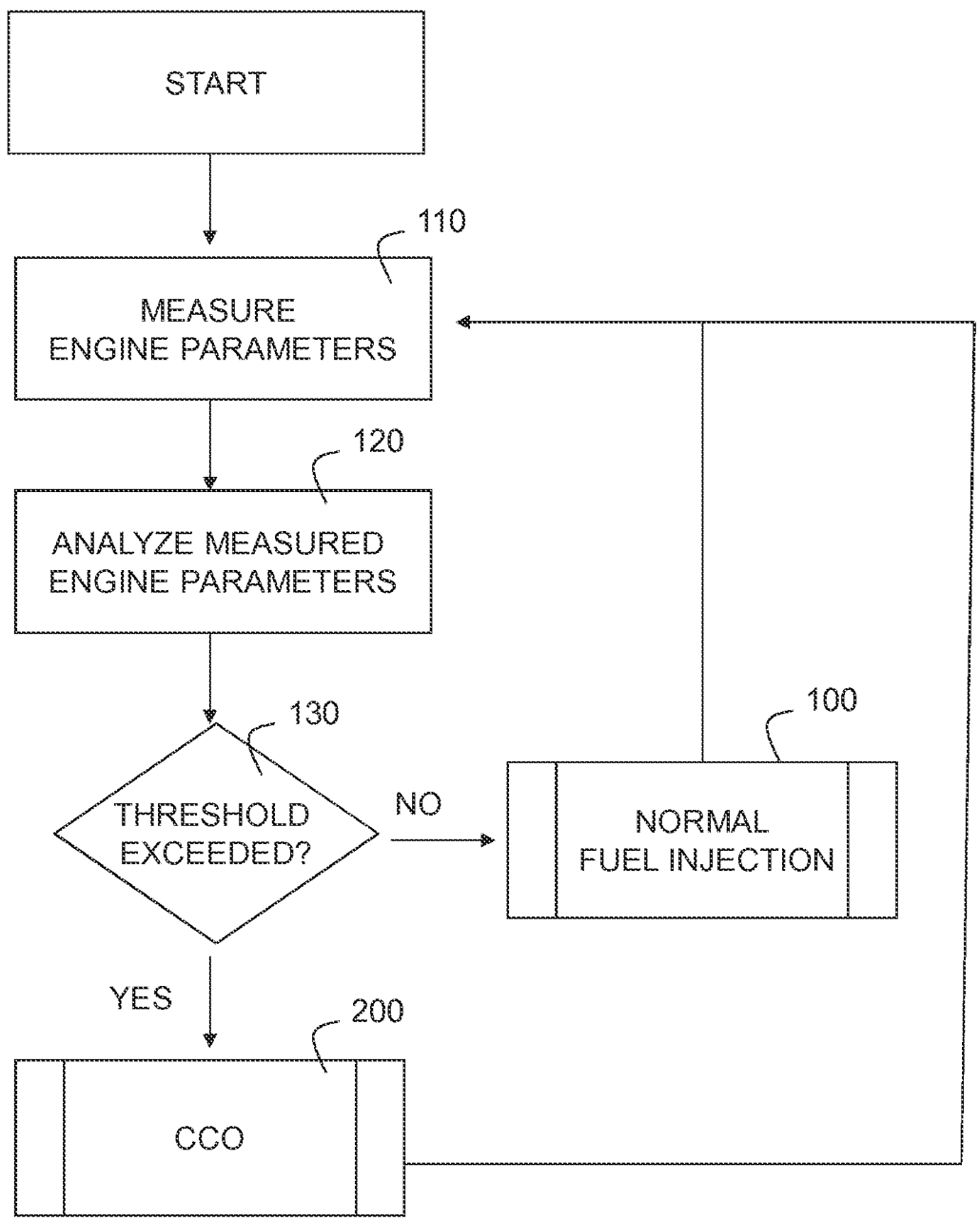

FIG. 3 illustrates steps to determinate need for CCO state. Measured engine parameters in step 110 can be, for example cylinder-wise cylinder pressures, cylinder knock value and exhaust-gas temperatures.

Measured engine parameters are analyzed in step 120 to determine burning state of said cylinders. Occurrence of abnormal combustion in cylinder 3, i.e. poor cylinder performance can be determined by analyzing one or several measurements and comparing resulting value or values to predetermined threshold (step 130). Normal fuel injection (step 100) is continued if occurrence of abnormal combustion in cylinder 3 is not detected. Normal fuel injection (step 100) is stopped if occurrence of abnormal combustion in cylinder 3 is detected and fuel injection is controlled according to CCO state.

Figure 4:
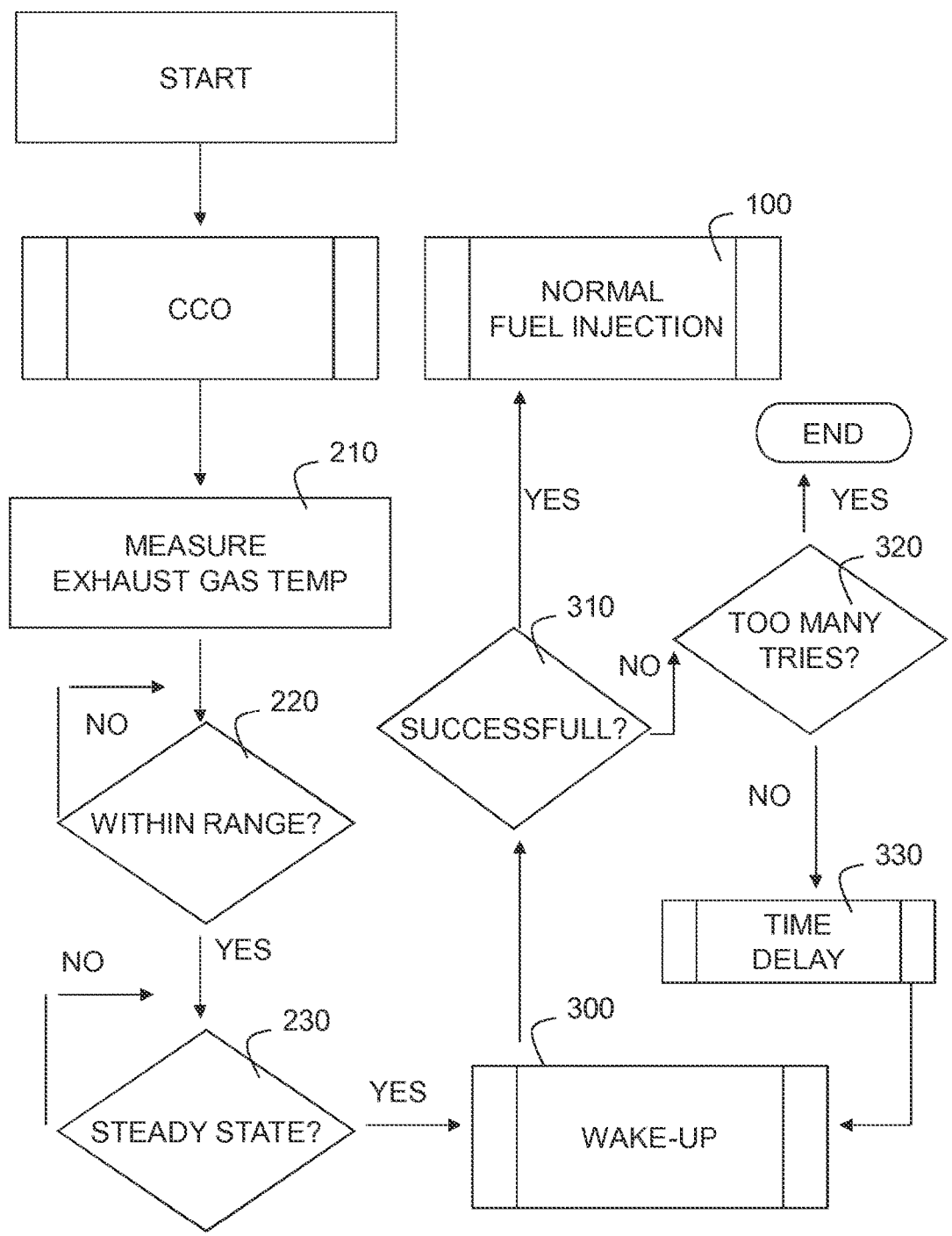

FIG. 4 illustrates steps executed after cylinder has been set to CCO state (step 200 in FIG. 3). After cylinder has been set to CCO state, the exhaust-gas temperature of the cylinder in question is measured (step 210) and when the temperature is under a certain level or within certain predetermined range, it is determined (step 230) that cylinder has reaches steady-state. More preferably, steady-state of CCO cylinder is determined if the measured temperature reaches a given standard deviation or variance for a time window $t_1$.

The fuel injection is restarted by wake-up procedure (step 300). If no change is detected in the exhaust-gas temperature, cylinder pressure or other signal indicative of the combustion process, has happened for a given time period $t_2$, the cylinder is again set to CCO state to prevent excessive leakage of fuel to the exhaust gas system.

If the exhaust-gas temperature increases during the wake-up attempt a given amount of degrees during $t_2$, the wake-up action is defined as successful and the cylinder is set in normal state (step 100).

The period of time (step 330) predetermined for restricted injection in CCO state is dependent on number attempt of the restoration main fuel injection. The number attempts of the restoration main fuel injection is limited (step 320). This has an advantage in that first attempt can be rather soon after CCO state and time between further attempts can extended and number of attempts can be limited.

Figure 5:
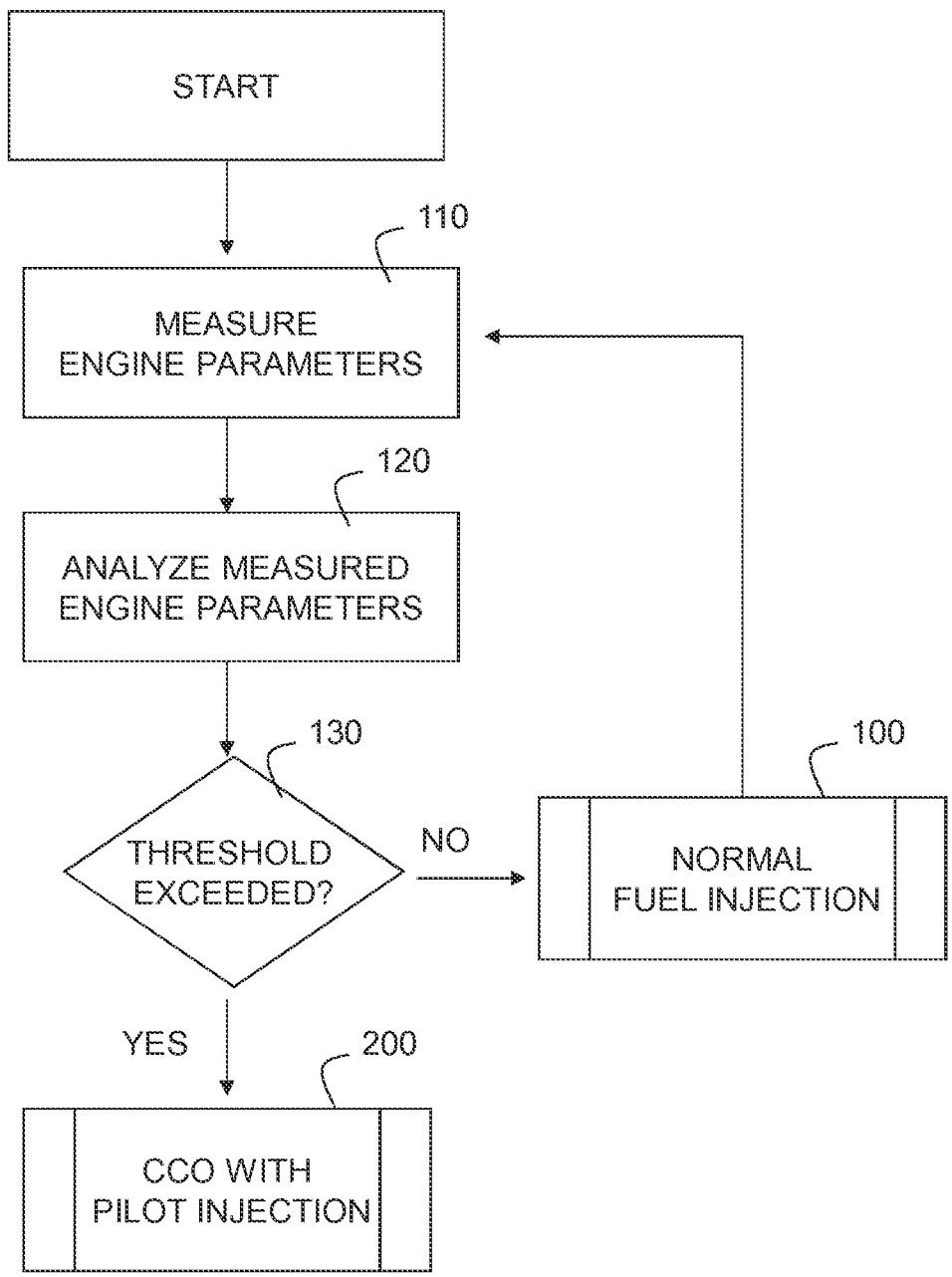

FIG. 5 illustrates steps to determinate need for CCO with pilot injection. Measured engine parameters in step 110 can be, for example cylinder-wise cylinder pressures, cylinder knock value and exhaust-gas temperatures.

Measured engine parameters are analyzed in step 120 to determine burning state of said cylinders. Occurrence of abnormal combustion in cylinder 3, i.e. poor cylinder performance can be determined by analyzing one or several measurements and comparing resulting value or values to predetermined threshold (step 130). Normal fuel injection (step 100) is continued if occurrence of abnormal combustion in cylinder 3 is not detected. Normal fuel injection (step 100) is stopped if occurrence of abnormal combustion in cylinder 3 is detected and fuel injection is controlled according to CCO with pilot injection state.

Figure 6:
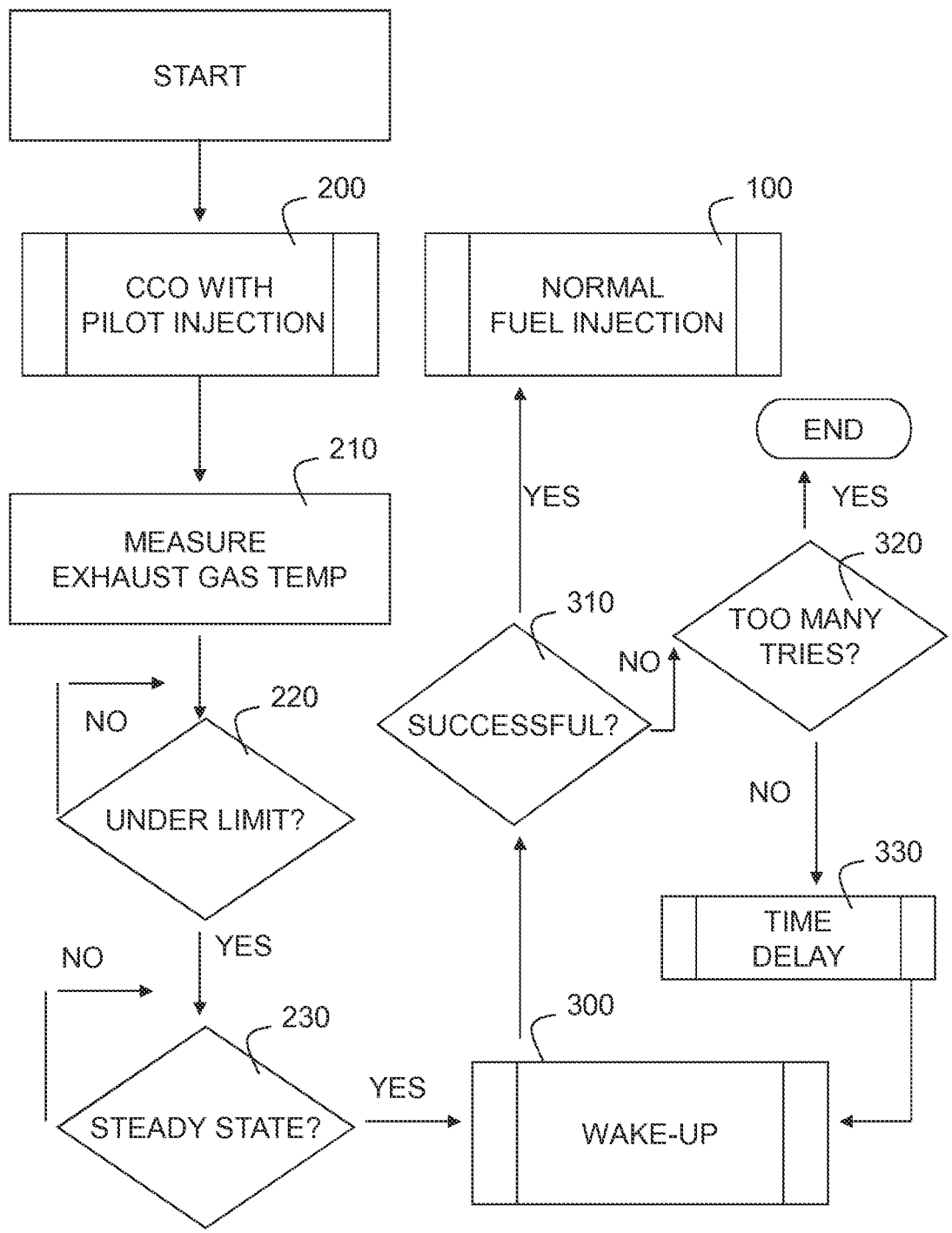

FIG. 6 illustrates steps executed after cylinder has been set to CCO with pilot injection state (step 200 in FIG. 3). After cylinder has been set to CCO state, the exhaust-gas temperature of the cylinder in question is measured (step 210) and when the temperature is under a certain level or within certain predetermined range, it is determined (step 230) that cylinder has reaches steady-state. More preferably, steady-state of CCO with pilot injection cylinder is determined if the measured temperature reaches a given standard deviation or variance for a time window $t_1$.

The fuel injection is restarted by wake-up procedure (step 300). If no change is detected in the exhaust-gas temperature, cylinder pressure or other signal indicative of the combustion process, has happened for a given time period $t_2$, the cylinder is again set to CCO with pilot injection state to prevent excessive leakage of fuel to the exhaust gas system.

If the exhaust-gas temperature increases during the wake-up attempt a given amount of degrees during $t_2$, the wake-up action is defined as successful and the cylinder is set in normal state (step 100).

The period of time (step 330) predetermined for restricted injection in CCO with pilot injection state is dependent on number attempt of the restoration main fuel injection. The number attempts of the restoration main fuel injection is limited (step 320). This has an advantage in that first attempt can be rather soon after CCO with pilot injection state and time between further attempts can extended and number of attempts can be limited.

The burning state of the cylinder for which the cutoff of main fuel is made is detected 110 and compared 130 to burning state predetermined for amount of fuel injected by the pilot nozzle. This way the effect of such amount of pilot fuel can be predetermined and resulting effect can be compared. Therefore, the success of closing of primary main fuel injection can be determined with increased certainty, because combustion of primary fuel can be identified.

The amount of pilot fuel injected to the cylinder 3 for which the cutoff of main fuel is made can also be increased. The amount of pilot fuel can be changed by control device. More pilot fuel means more effect and more liable determination of CCO cylinders output. Result is also less vibrations due to the control operation CCO of one cylinder. The effect of such increased amount can also be determined and resulting change in effect can be compared.

It is evident from the description and examples presented above that an embodiment of the invention can be created using a variety of different solutions. It is evident that the invention is not limited to the examples mentioned in this text but can be implemented in many other different embodiments. Therefore any inventive embodiment can be implemented within the scope of the inventive idea.

The invention claimed is:

1. A method of operating an internal combustion engine using gaseous main fuel and liquid pilot fuel, which engine has a plurality of cylinders and an engine controller capable of adjusting a burning state of each cylinder through fuel regulation, including fuel cut off, upon occurrence of abnormal combustion, wherein upon occurrence of abnormal combustion, each cylinder having a cylinder-specific gaseous fuel injector and a cylinder-specific liquid fuel injector, wherein abnormal combustion is determined by the engine controller sensing at least one of a cylinder pressure, cylinder knocking and exhaust gas temperature, wherein upon occurrence of abnormal combustion in a respective cylinder, in a gaseous mode, a cut off of gaseous main fuel into only said respective cylinder is executed and the fuel injection is kept partially active with a pilot fuel injected by a pilot nozzle of the cylinder-specific liquid fuel injector of said respective cylinder, and wherein normal fuel injection, determined by the engine controller based upon sensing the exhaust gas temperature, is provided to cylinders where abnormal fuel injection is not detected.

2. The method according to claim 1, wherein the burning state of the respective cylinder, for which the cutoff of gaseous main fuel is made, is detected and compared to a burning state predetermined for an amount of fuel injected by the pilot nozzle of the cylinder-specific liquid fuel injector.

3. The method according to claim 1 wherein the amount of the pilot fuel injected to the respective cylinder, for which the cutoff of main fuel is made, is increased.

4. A method of operating an internal combustion engine using gaseous main fuel and liquid pilot fuel and having a plurality of cylinders and an engine controller capable of adjusting a burning state of each cylinder through fuel regulation, the method comprising: upon occurrence of abnormal combustion, each cylinder of the plurality of cylinders having a cylinder-specific gaseous fuel injector and a cylinder-specific liquid fuel injector, wherein abnormal combustion is determined by the engine controller sensing at least one of a cylinder pressure, cylinder knocking, and exhaust gas temperature, wherein upon occurrence of abnormal combustion in a respective cylinder of the plurality of cylinders in a gaseous mode, cutting off the gaseous main fuel into only said respective cylinder of one of the plurality of cylinders; maintaining the fuel injection partially active with a pilot fuel injected by said cylinder-specific liquid fuel injector of respective cylinder of one of the plurality of cylinders; and normal fuel injection, determined by the engine controller based upon sensing the exhaust gas temperature, is continued in cylinders of the plurality of cylinders where abnormal combustion is not detected.

5. An internal combustion engine using gaseous main fuel and liquid pilot fuel, the internal combustion engine comprising: a plurality of cylinders; and an engine controller configured to adjust a burning state of the plurality of cylinders through fuel regulation, including fuel cut off, wherein upon occurrence of abnormal combustion, each cylinder of the plurality of cylinders having a cylinder-specific gaseous fuel injector and a cylinder-specific liquid fuel injector, wherein abnormal combustion is determined by the engine controller sensing at least one of a cylinder pressure, cylinder knocking, and exhaust gas temperature, wherein upon occurrence of abnormal combustion in a respective cylinder of the plurality of cylinders, the engine controller is configured to cut off of the gaseous main fuel into only said respective cylinder of one of the plurality cylinders and fuel injection is kept partially active with the liquid pilot fuel injected by a pilot nozzle of the cylinder-specific liquid fuel injector of said respective cylinder of one of the plurality of cylinders, and wherein normal fuel injection, determined by the engine controller based upon sensing the exhaust gas temperature, is continued in cylinders of the plurality of cylinders where abnormal combustion is not detected.

* * * * *